No. 669,560. Patented Mar. 12, 1901.
J. W. TAVENNER.
COMBINATION PLANTER AND CULTIVATOR.
(Application filed Sept. 25, 1899.)
(No Model.) 2 Sheets—Sheet 1.
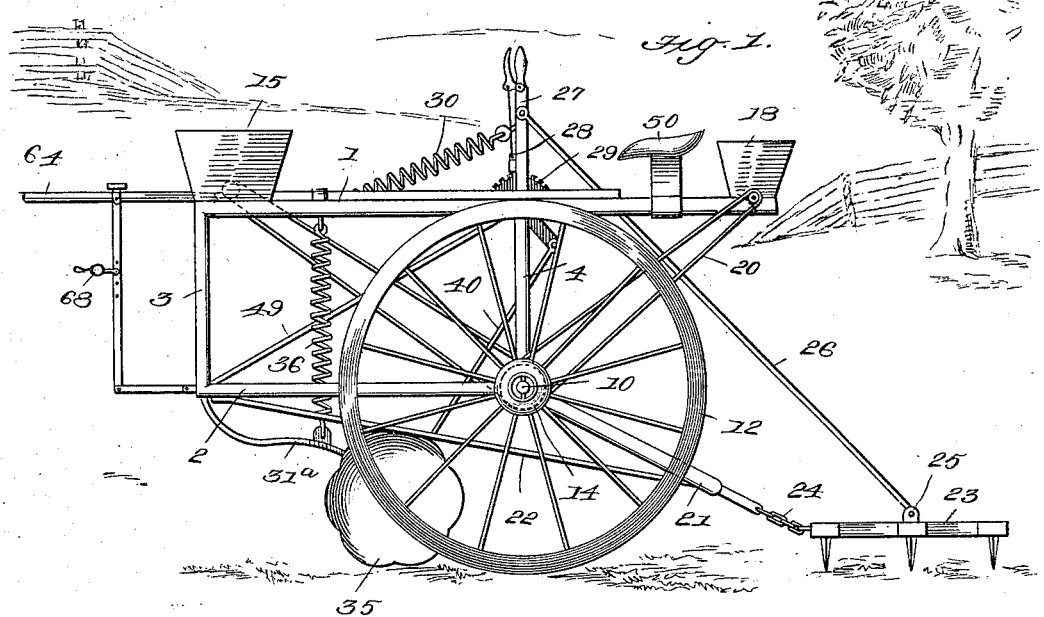
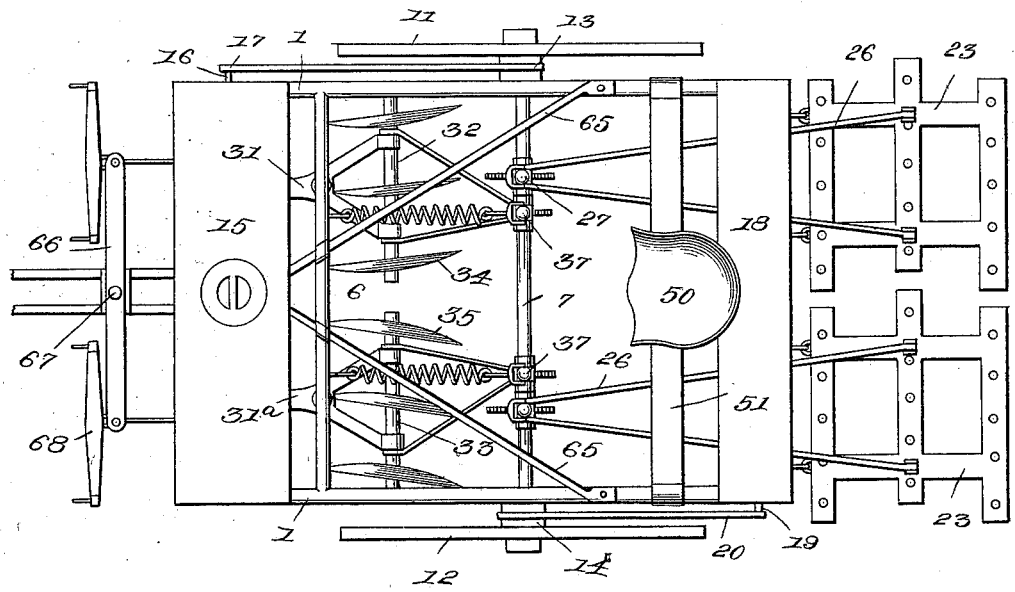
Witnesses
Inventor
J. W. Tavenner,
Attorneys.

No. 669,560. Patented Mar. 12, 1901.
J. W. TAVENNER.
COMBINATION PLANTER AND CULTIVATOR.
(Application filed Sept. 25, 1899.)
(No Model.) 2 Sheets—Sheet 2.
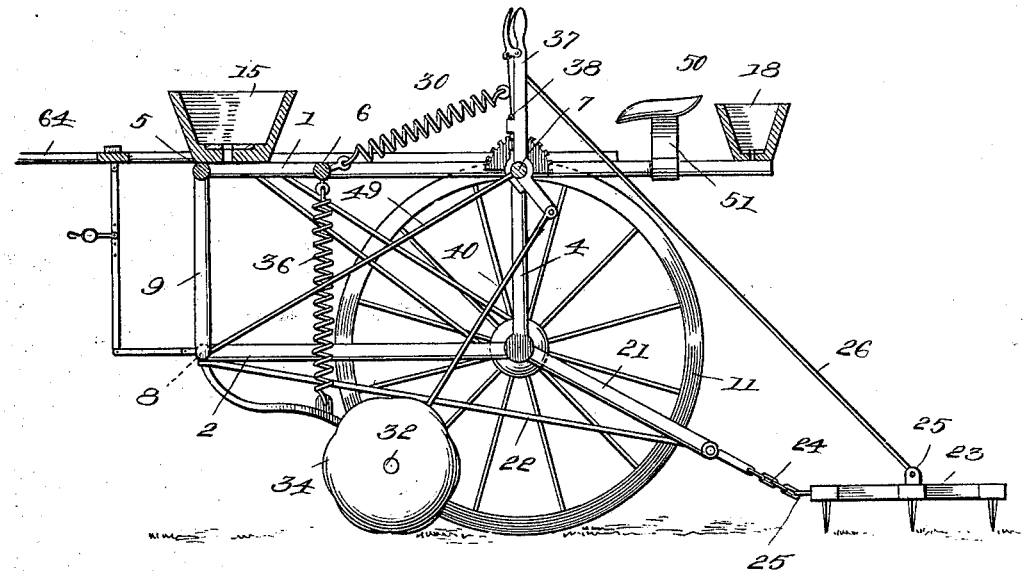
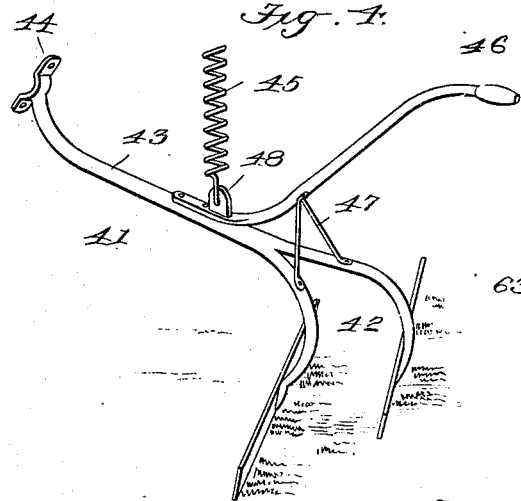
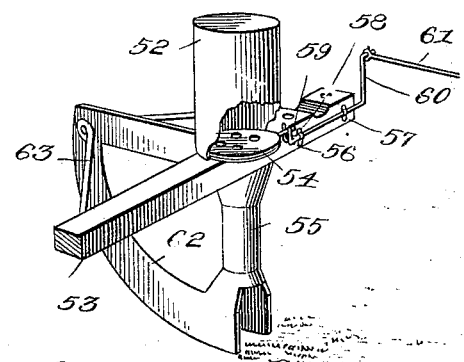
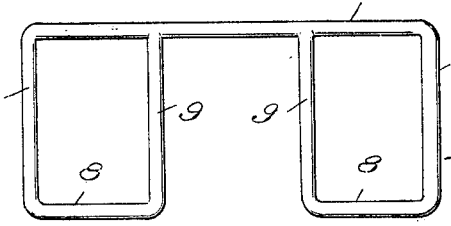
Witnesses
F. W. Riley,
Clarence Shaw
Inventor
J. W. Tavenner,
by O'Meara & Co.
Attorneys

UNITED STATES PATENT OFFICE.

JAMES W. TAVENNER, OF BLOOMINGTON, ILLINOIS.

COMBINATION PLANTER AND CULTIVATOR.

SPECIFICATION forming part of Letters Patent No. 669,560, dated March 12, 1901.

Application filed September 25, 1899. Serial No. 731,609. (No model.)

*To all whom it may concern:*

Be it known that I, JAMES W. TAVENNER, a citizen of the United States, residing at Bloomington, in the county of McLean and State of Illinois, have invented a new and useful Improvement in a Combination Planter and Cultivator, of which the following is a specification.

My invention is in the nature of a machine or implement combining in one structure suitable mechanism for simultaneously sowing grain, cultivating the soil, sowing grass-seed, if desired, and harrowing it in and by the adjustment of suitable parts to be adapted to simultaneously prepare the soil and drop or drill corn, the object being to economize in the cost of machinery and in the expenditure of labor and time.

In the drawings forming part of this specification, Figure 1 is a view in side elevation of an implement constructed in accordance with my invention arranged to simultaneously sow grain, cultivate the soil, sow grass-seed, and harrow it in. Fig. 2 is top plan view of the same. Fig. 3 is a vertical longitudinal section of the same. Fig. 4 is a detail perspective view of the gang-cultivators detached. Fig. 5 is a similar view of the corn-drilling mechanism detached, and Fig. 6 is a front elevation of the main frame.

Like numerals of reference indicate the same parts wherever they appear in the several figures of the drawings.

Referring to the drawings by numerals, 1 and 2 indicate the top and bottom longitudinal bars of the main frame, connected by vertical front and rear bars 3 and 4, forming a rectangular frame on each side connected together by front, intermediate, and rear cross-bars 5, 6, and 7, as shown in Figs. 2 and 3. The front of the frame on each side has a horizontal bar 8, extending inward about one-third the width of the implement and joined at its inner end to the front cross-bar 5 by means of an upright bar 9. The foregoing parts of the frame constitute straight pieces or bars of metal or other suitable material, which are secured to each other at their ends and intermediate points by means of the usual bolts and couplings and will need no further description, as such construction is well known in the art. At the rear lower corner of each side rectangular frame a spindle 10 projects outwardly, and on these spindles are journaled the traction-wheels 11 and 12, the hubs 13 and 14 of which are formed as pulleys to drive the seeding mechanism.

Upon the front part of the frame is mounted a grain-sowing mechanism, the box 15 of which extends entirely across the frame. A shaft 16 extends through the seeder and carries a pulley at its outer end connected by a belt 17 with the hub 13 of wheel 11, by means of which it is driven. The top bars 1 of the side frames extend back beyond the supports or bars 4, and a grass-seeder is mounted on the rear end of the frame, having a box 18, with a shaft 19 therein, connected at one end by a belt 20 with hub 14 of wheel 12, by means of which it is driven.

21 indicates a backwardly and downwardly inclined bar secured at the rear lower corner of the frame, there being one on each side, each bar being connected at its lower end to the front of the frame by a brace 22. A harrow 23 is connected to the bars 21 by chains 24, and to the top of the harrow at 25 double braces 26 are connected, their upper ends being connected to hand-levers 27, pivoted on rear cross-bar 7 of the frame and held at any angle by means of spring-pawls 28, engaging curved racks 29, secured to the frame. The levers are connected to cross-bar 6 by means of springs 30.

Bifurcated arms 31 and 31$^a$ are pivotally secured to horizontal bars 8 of the frame, and in their forks are journaled axles or shafts 32 33, carrying spading-disks 34 35, said shafts being slightly inclined backward to give the disks position at a slight angle to the line of motion. The arms 31 and 31$^a$ are yieldingly supported from cross-bar 6 by springs 36 and are raised or lowered by operating hand-levers 37, pivoted on cross-bar 7 and held at any angle by means of spring-pawls 38, engaging curved racks 39, secured to the frame, the levers 37 being connected to the axles by rods 40.

A gang of cultivator-plows 41 on the forked ends 42 of bars 43 are connected to horizontal bar 8 by clamps 44, and bars 43 are yieldingly supported from cross-bar 5 by springs 45, a handle 46 being secured to each bar 43 and connected to forked ends 42 by braces 47, the springs 45 being connected in lugs 48 of said handles. Braces 49 connect bars 8 with bar 7.

50 indicates a seat mounted on a strip 51, slidably secured upon top bars 1, so as to permit of the adjustment of the seat forward and backward to afford a counterbalance under different conditions or adjustments of the parts of the machine.

52 indicates the corn-box, shown in Fig. 5 as cylindrical, although it might be made of any other suitable form. It is mounted on a beam 53 and is provided with a perforated disk 54 in its bottom, in the openings of which the corn is measured and dropped into a discharge-tube 55. The disk is operated to discharge the corn by means of a rock-shaft 56, journaled in bearings 57, secured to beam 53, said shaft being provided at one end with a forked arm 58 to embrace a pin 59, projecting from the disk, and at its opposite end with an arm 60, adapted to be operated to rock the shaft by a rod 61, connecting it to some moving part of the implement. A shoe 62, curved upward from the lower end of the discharge-tube, is formed thereon or secured thereto and has a beam or bar 63 at its upper end connecting it with beam 53. The shoe opens a gutter or furrow in the ground to receive the corn.

64 indicates the tongue of the machine, which forks within the frame, as at 65 65, and is secured at its inner ends to the bars 1 of the frame, thus strengthening and stiffening the tongue itself and causing it to serve the purpose of braces for the frame.

Doubletree 66 is attached to the tongue by bolt 67, and singletrees 68 are attached at the ends of the doubletree in the usual manner.

In fall or spring plowing, making ready for planting corn, my improved machine will simultaneously cultivate the ground, harrow it, and by means of the corn-drill attachment will also plant the corn. With the grain-seeder, spading-disks, grass-seeder, and harrow, as shown, this machine will simultaneously sow grain, cultivate it in by means of the spading-disks, sow grass-seed, and harrow the ground.

Having thus fully described my invention, what I claim as new, and desire to secure by Letters Patent of the United States, is—

1. In a planter and cultivator, the combination, with two wheel-supported side frames, cross-pieces and a seat, each of said frames being provided with a rearwardly and downwardly extending bar and brace, of a harrow flexibly connected with the rear end of each bar, and two hand-levers upon one of the cross-pieces, one on each side of the seat and connected with one of the harrows, substantially as described.

2. In a planter and cultivator, the combination, with two wheel-supported side frames, cross-pieces and a seat, of a brace extending from the lower front corner of each of the frames to one of the cross-pieces, and a bar extending downwardly and rearwardly from the rear end of each frame, a cultivator-gang suspended from the front of each frame and a harrow from each bar at the rear, and two hand-levers upon said cross-piece on each side of the seat, one of which is connected with one of the cultivator-gangs and the other one is connected with one of the harrows, substantially as described.

3. In a planter and cultivator, the combination, with two wheel-supported side frames, cross-pieces at the tops thereof, of a hand-lever on one of the cross-pieces, a spring from the lever to one of the other cross-pieces, a cultivator-frame suspended from the side frames, and a spring from one of the cross-pieces to the cultivator-frame.

JAMES W. TAVENNER.

Witnesses:
E. W. SUTHERLAND,
C. F. KOCH.